United States Patent
Hershkovitz (10) Patent No.: US 11,487,276 B2
(45) Date of Patent: Nov. 1, 2022

(54) SALVAGING OUTPUTS OF TOOLS

(71) Applicant: INTERNATIONAL BUSINESS MACHINES CORPORATION, Armonk, NY (US)

(72) Inventor: Oz Dov Hershkovitz, Zichron Yaacov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 16/807,570

(22) Filed: Mar. 3, 2020

(65) Prior Publication Data
US 2021/0278831 A1 Sep. 9, 2021

(51) Int. Cl.
*G05B 23/02* (2006.01)

(52) U.S. Cl.
CPC ..... *G05B 23/0256* (2013.01); *G05B 23/0224* (2013.01); *G05B 23/0262* (2013.01)

(58) Field of Classification Search
CPC ........... G05B 23/0256; G05B 23/0224; G05B 23/0262; G06F 11/004; G06F 11/263; G06F 11/3684; G06F 11/36
See application file for complete search history.

(56) References Cited

U.S. PATENT DOCUMENTS

| | | |
|---|---|---|
| 6,105,148 A | 8/2000 | Chung et al. |
| 8,510,743 B2 | 8/2013 | Hackborn et al. |
| 2003/0002366 A1 * | 1/2003 | Mizoguchi ............ G11C 29/76 365/201 |
| 2007/0162779 A1 | 7/2007 | Downer et al. |
| 2009/0113444 A1 * | 4/2009 | Hackborn ............ G06F 3/0481 719/312 |
| 2012/0226524 A1 * | 9/2012 | Corbett ............ G06Q 10/0631 705/43 |
| 2016/0196185 A1 * | 7/2016 | Gu ...................... G06F 11/1438 714/15 |

FOREIGN PATENT DOCUMENTS

| | | | | |
|---|---|---|---|---|
| EP | 2280348 A1 | | 2/2011 | |
| JP | H07182192 | * | 7/1995 | ............ G06F 11/22 |
| JP | H1116276 | * | 1/1999 | ............ G11B 20/10 |

OTHER PUBLICATIONS

S. Droege, "On the practicality of Manna's method of verifying the termination and correctness of programs", Rutgers University, Department of Computer Science, Technical Report #13, Oct. 1971, 80 pages—https://doi.org/10.7282/t3-rmpe-j178.*
"NBS Special Publication 500-75 Validation, Verification, and Testing of Computer Software", U.S. Department of Commerce, National Bureau of Statistics, Spec. Publ. 500-75, 62 pages (Feb. 1981).*
Gauher, "Evaluating Failure Prediction Models for Predictive Maintenance", Machine Learning Blog, Apr. 19, 2016. 6p.

* cited by examiner

*Primary Examiner* — Alexander Satanovsky
(74) *Attorney, Agent, or Firm* — Cantor Colburn LLP; Tihon Poltavets (57) ABSTRACT

A method of salvaging an output is provided. The method includes defining a condition for terminating a run of a tool, checking whether the condition is likely to be met during a running of the tool, terminating the running in an event the condition is likely to be met, checking a validity of an incomplete output of the tool generated during the running and finalizing the incomplete output in an event the incomplete output is valid.

14 Claims, 4 Drawing Sheets

SALVAGING OUTPUTS OF TOOLS

BACKGROUND

The present invention generally relates to software, and more specifically, to a method of salvaging outputs of tools using randomization.

Test generation is one aspect of hardware testing, and it includes the process of creating a set of test data or test cases for testing the adequacy of new or revised hardware. Random test data generation is one of the simplest processes for generating test data and can be used to generate input for any type of hardware. In general, random test generation involves randomly generating bit streams and letting the bit streams represent a type of data that is needed.

SUMMARY

Embodiments of the present invention are directed to a method of salvaging an output. A non-limiting example of the method includes defining a condition for terminating a run of a tool, checking whether the condition is likely to be met during a running of the tool, terminating the running in an event the condition is likely to be met, checking a validity of an incomplete output of the tool generated during the running and finalizing the incomplete output in an event the incomplete output is valid.

Embodiments of the present invention are directed to a method of salvaging an output of a tool. A non-limiting example of the method includes defining a condition for terminating a run of the tool, running the tool, checking whether the condition is likely to be met during and in parallel with the running of the tool, injecting a control statement into logic of the tool to immediately terminate the running in an event the condition is met, checking a validity of an incomplete output of the tool generated during the running following the termination and finalizing the incomplete output in an event the incomplete output is valid.

Embodiments of the present invention are directed to a computer system for salvaging an output of a tool including a processor and a memory. The memory has executable instructions stored thereon, which, when executed, cause the processor to execute a method. A non-limiting example of the method includes checking whether one or more conditions is likely to be met during a running of the tool, terminating the running in an event the one or more conditions is likely to be met, checking a validity of an incomplete output of the tool generated during the running and finalizing the incomplete output in an event the incomplete output is valid.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

It is often the case that a software tool that produces some output, such as a random test case generator that produces test cases, for example, uses randomization in its processes. For these types of tools, there is a chance of failure during execution and, in many cases, this failure might occur after a long execution time. In conventional settings, when a failure occurs after a long execution time, all the data that was accumulated during the execution is lost.

In a particular instance, a test case generator can be run whereby the test case generator may have already generated thousands of instructions but then fails for some reason. The failure results in all the progress of the test case generator being thrown away. This can be true for a test case generator tool that is generating data in a non-deterministic way but might also be true for a deterministic tool if the failure originates from a time limit that is violated.

One or more embodiments of the present invention provide systems and methods for predicting that a failure is going to happen during an execution of a test case generator and for switching to a generation mode from which a valid result can be drawn. This involves the use of a mechanism that constantly checks for certain conditions. The mechanism can be triggered when one or more of those conditions are satisfied as a signal that it can be time to try to salvage results on the test case generator. The systems and methods for the predicting and the switching do not require changes to any existing inputs and can further include a recording of decisions for later recreations of test generation runs.

Figure 1:
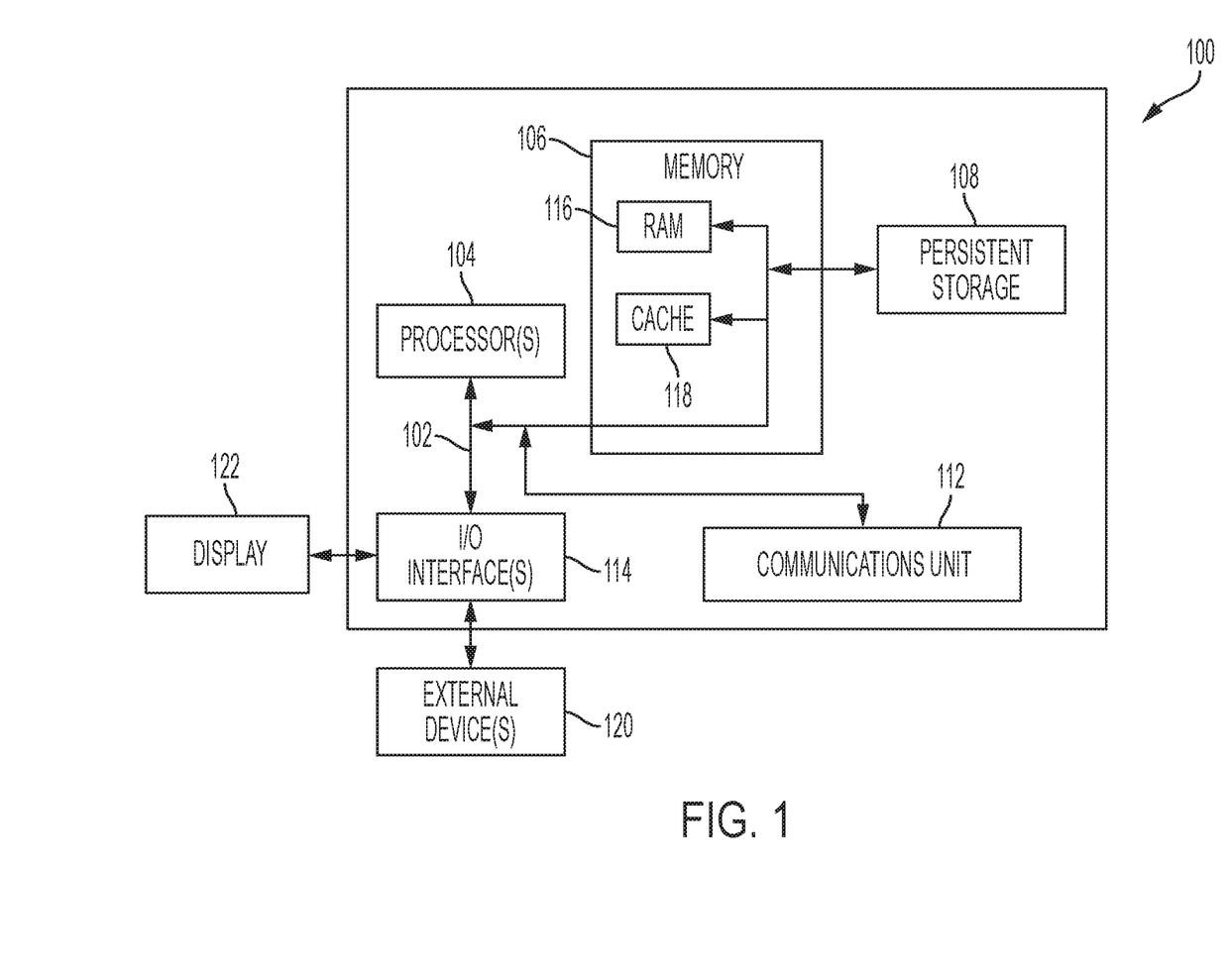
FIG. 1 depicts a block diagram of components of a computer in accordance with one or more embodiments of the present invention.

Turning now to FIG. 1, components of a computer 100 are provided in accordance with one or more embodiments of the present invention. It should be appreciated that FIG. 1 provides only an illustration of one implementation and does not imply any limitations with regard to the environments in which different embodiments may be implemented. Many modifications to the depicted environment may be made.

As depicted, the computer 100 includes communications bus 102, which provides communications between computer processor(s) 104, memory 106, persistent storage 108, communications unit 112 and input/output (I/O) interface(s) 114. Communications bus 102 can be implemented with any architecture designed for passing data and/or control information between processors (such as microprocessors, communications and network processors, etc.), system memory, peripheral devices and any other hardware components within a system. Communications bus 102 can be provided as one or more communications buses 102.

The memory 106 and persistent storage 108 are computer-readable storage media. The memory 106 includes random access memory (RAM) 116 and cache memory 118. In general, the memory 106 can include any suitable volatile or non-volatile computer-readable storage media.

One or more programs may be stored in persistent storage 108 for access and/or execution by one or more of the respective computer processors 104 via one or more memories of memory 106. The persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory or any other computer-readable storage media that is capable of storing program instructions or digital information.

The media used by persistent storage 108 may also be removable. For example, a removable hard drive may be used for persistent storage 108. Other examples include optical and magnetic disks, thumb drives and smart cards that are inserted into a drive for transfer onto another computer-readable storage medium that is also part of persistent storage 108.

The communications unit 112 provides for communications with other data processing systems or devices and includes one or more network interface cards. The communications unit 112 may provide communications through the use of either or both physical and wireless communications links.

The I/O interface(s) 114 allows for input and output of data with other devices that may be connected to computer 100. For example, I/O interface 114 may provide a connection to external devices 120 such as a keyboard, keypad, a touch screen and/or some other suitable input device. The external devices 120 can also include portable computer-readable storage media such as, for example, thumb drives, portable optical or magnetic disks and memory cards. Software and data used to practice one or more embodiments of the present invention can be stored on such portable computer-readable storage media and can be loaded onto persistent storage 108 via the I/O interface(s) 114. The I/O interface(s) 114 can also connect to a display 122 which provides a mechanism to display data to a user and may be, for example, a computer monitor.

Figure 2:
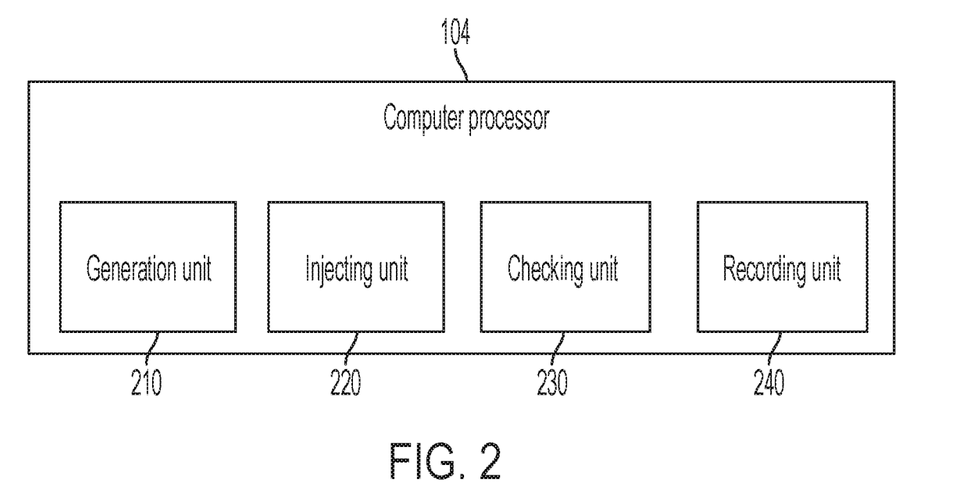
FIG. 2 is a schematic diagram of components of a computer processor of the computer of FIG. 1 in accordance with one or more embodiments of the present invention.

With reference to FIGS. 1 and 2, the persistent storage 108 shown in FIG. 1 can have executable instructions stored thereon which are readable and executable by the computer processors 104. When the executable instructions are read and executed by the computer processors 104, the executable instructions cause the computer processors 104 to operate as a control language generation unit (hereinafter referred to as a "generation unit") 210, an injecting unit 220, a checking unit 230 and a recording unit 240.

The generation unit 210 is configured to manually or automatically add a control statement to language of a tool, such as a test generator tool, whereby the control statement serves to signal the tool to wrap up what the tool is currently generating and to converge towards creating an output. When executed, the control statement effectively causes the tool to abandon a regular flow and perform necessary actions to arrive at or to obtain a valid outcome. The injecting unit 220 provides for an automatic or manual injection of the control statement in any given moment during a running of the tool as a reaction to one or more conditions being met. As an example, in an event a tool is running in an environment with a 4 gigabyte limitation or a specific time limit, a condition for injection of the control statement could be that if 3.9 gigabytes of memory are consumed by the tool or the specific time limit is about to be reached, an output of the tool is to be salvaged immediately (i.e., before the running of the tool is terminated at the 4 gigabyte limit or the time limit whereupon the output of the tool would otherwise be lost).

In accordance with embodiments, the injecting unit 220 can be configured to track statistics and, using heuristics to analyze those statistics in real-time during a running of a tool, to determine whether there is a high probability of an eventual failure of the tool. That is, in an event a tool historically uses most of its allotted time to complete 75% of a run but then successfully completes the remainder of the run in the remaining time, the injecting unit 220 can delay an injection of the control statement until a probability of failure increases beyond a predefined threshold. Conversely, in an event a tool historically uses a small fraction of its allotted time to complete 75% of a run and then successfully completes the remainder of the run in the relatively large amount of remaining time, the injecting unit 220 will tend to inject the control statement in an event the tool seems to be executing unusually slowly.

The checking unit 230 is configured such that, upon a triggering of the control statement being injected and a premature termination of the tool, the checking unit 230 determines whether a result of the tool can be created. Once the checking unit 230 confirms that the result is valid and can be created, the checking unit 230 finalizes the result and the recording unit 240 subsequently records the result of the running of the tool in a test file when the running of the tool is completed or terminated.

Figure 3:
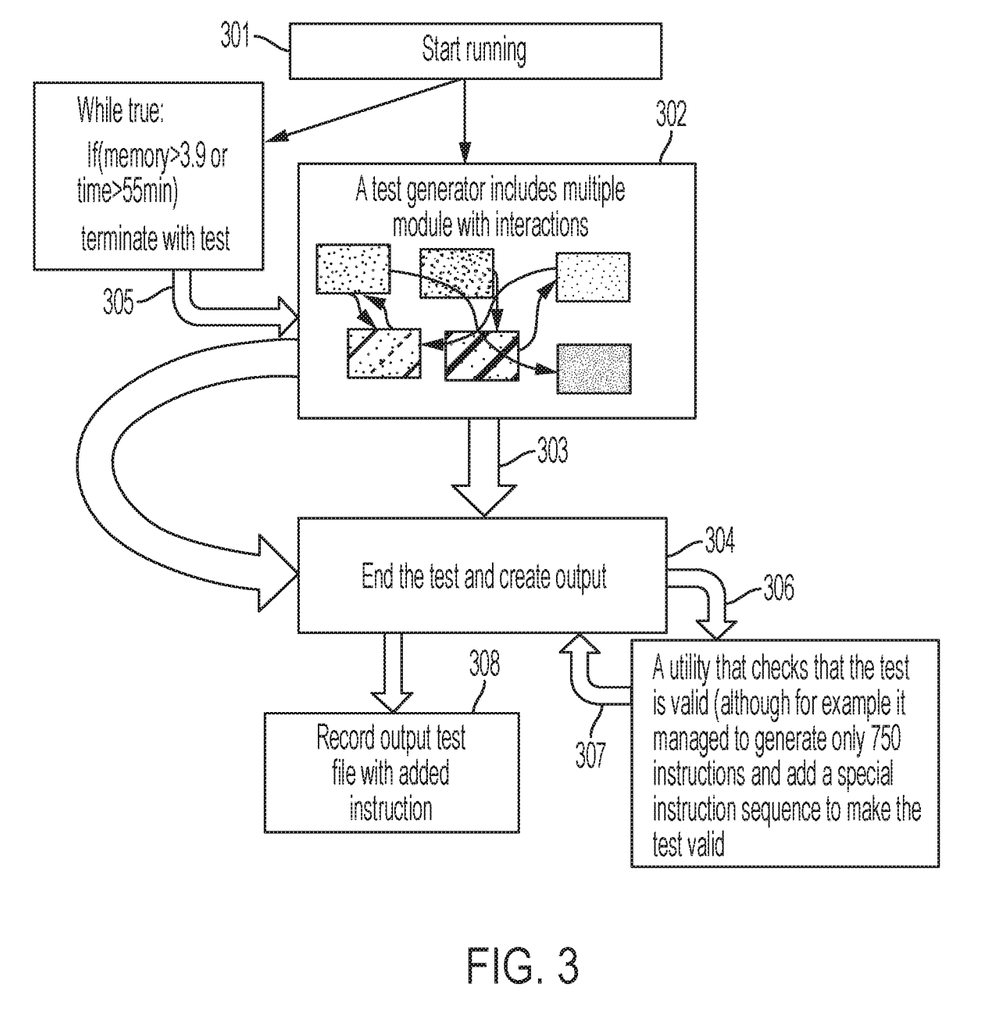
FIG. 3 is a flow diagram schematically illustrating a method of terminating a run of a tool and salvaging an output of the tool in accordance with embodiments of the present invention.

With reference to FIG. 3, an exemplary embodiment of an execution of a tool that is enhanced by the features described above is illustrated. For the exemplary embodiment of FIG. 3, the tool can be a test generator program that generates one or more test files (i.e., assembler instructions) to test some functionality or core logic that is input by a user.

As shown in FIG. 3, at operation 301, the test generator starts to run. Then, at operation 302, the test generator begins generating 1000 random instructions one random instruction at a time in accordance with its internal or core logic.

At this point, it can be assumed that a user inputs two conditions for the run of the test generator. The first condition is that the running of the test generator should not consume more than 3.9 gigabytes. The second condition is that the running of the test generator will not last for more than 55 minutes. In this case, at the beginning of the run of the test generator and during the running of the test generator, the injecting unit 220 will periodically or iteratively determine whether either or both of the conditions are met. The injecting unit 220 will thus operate in parallel with the test generator and can use heuristics to analyze historical statistics of the test generator against current status data of the test generator to determine whether a failure of the test generator is imminent.

As used herein, a failure of the test generator might occur when either or both of the conditions are likely to be met but the normal generation flow continues. For example, in a conventional case, if the generation of the random instructions consumes more than 3.9 gigabytes and nothing is done to try and create an output, the generation is likely to hit a hard boundary of 4 gigabytes and crash without producing any result. This situation is avoided by one or more embodiments of the present invention as described herein.

If the test generator completes the generation of the 1000 random instructions without exceeding the time or memory limits at operation 303, the test generator will end the run and create an output test file at operation 304.

Alternatively, if it is assumed that after 55 minutes in the current run the test generator is only able to generate 750 instructions and is now dealing with the creation of the 751th instruction (or if the test generator is approaching the 3.9 gigabyte limit), the injecting unit 220 will cause the generation unit 210 to inject the control statement into the internal or core logic of the test generator at operation 305. This injection of the control signal causes the test generator to terminate the run and converge toward the creation of the output test file as in operation 304.

At operation 306, the checking unit 230 checks that the test is valid whether the test generator completed generating the 1000 random instructions or not and adds a special instruction sequence to signify that the test result is deemed valid at operation 307. In the case where the test generator did not complete generating the 1000 random instructions, the checking unit 230 can review the output that has been generated and determine if the output is meaningful and valid. If the checking unit 230 determines that the output is meaningful and valid, the checking unit 230 can provide an indication of this by adding a special instruction or a set of special instructions to the output to thereby finalize the output. Subsequently, the recording unit 240 records the output test file with the added special instruction or the added set of special instructions at operation 308.

Figure 4:
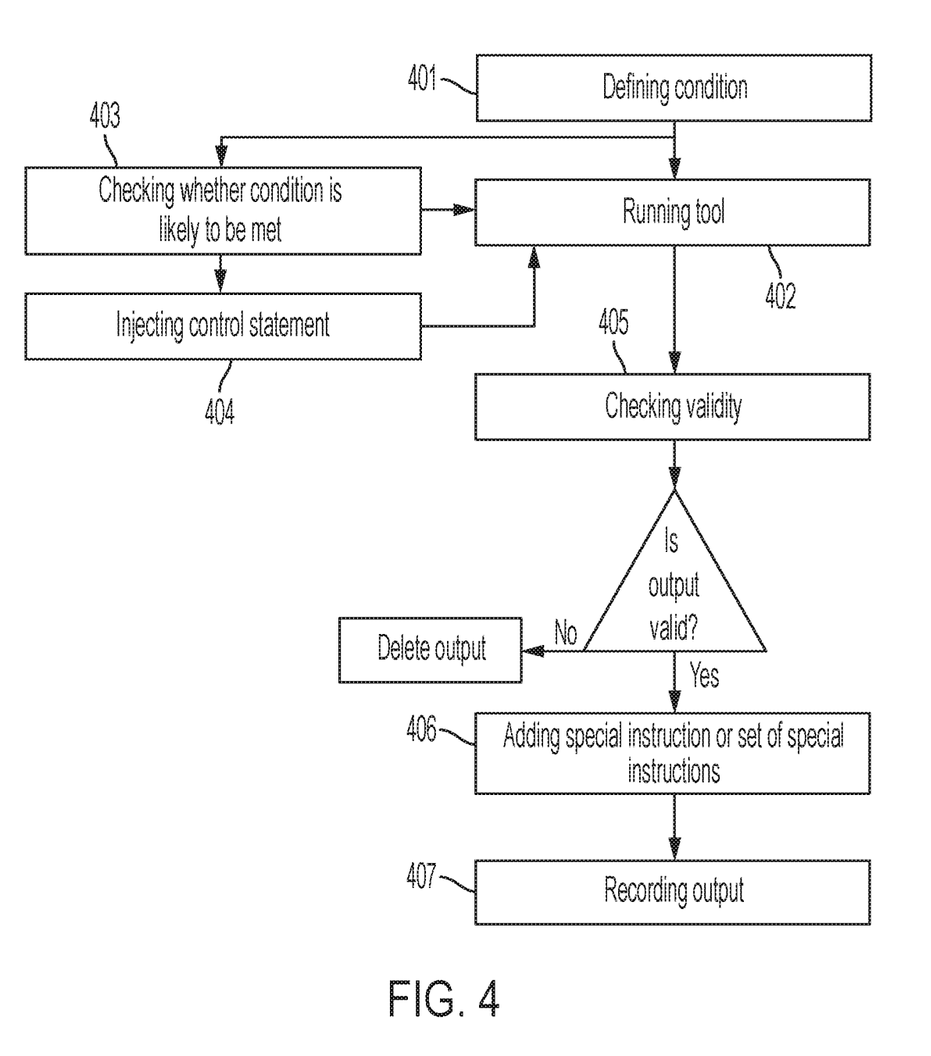
FIG. 4 is a flow diagram illustrating a method of salvaging an output of a tool in accordance with embodiments of the present invention.

In accordance with embodiments of the present invention, the output test file can include the following content in an event the test generator completes the generation of the 1000 random instructions without exceeding the time or memory limits:

Addr1 Inst1026
Addr2 Insr892
Addr3 Instr34
. . .
Addr999 Instr256
Addr1000 specialInstrToSignalEnd Conversely, in accordance with alternative embodiments of the present invention, the output test file can include the following content in an event the test generator does not complete the generation of the 1000 random instructions without exceeding the time or memory limits:

Addr1 Instr490
Addr2 Instr1920
. . .
Addr750 Instr358
Addr751 specialInstrToSignalEnd With reference to FIG. 4, a method of salvaging an output of a tool is provided. The tool can include or be provided as a test generator tool that uses randomization to generate randomized instructions. As shown in FIG. 4, the method includes defining a condition, such as one or more of a memory consumption condition and a timing condition, for terminating a run of the tool (401), running the tool (402), checking whether the condition is likely to be met during and in parallel with the running of the tool (403) and injecting a control statement into logic of the tool to terminate the running in an event the condition is likely to be met (404). The method further includes checking a validity of an incomplete output of the tool generated during the running following the termination (405) and, in case the incomplete output is deemed valid, the method also includes finalizing the incomplete output by, e.g., adding the special instruction or the set of special instructions (406). At this point, the method can include recording the incomplete output having been finalized as an output file (407).

The output file can include, for example, a sequence of address lines and a randomized instruction stored on each of the address lines. The checking of operation 405 can include a heuristic analysis of historical and current data.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of salvaging an output of a tool, comprising:
defining a condition for terminating a run of the tool;
running the tool;
checking whether the condition is likely to be met during the running of the tool;
injecting a control statement into logic of the tool to terminate the running in an event the condition is likely to be met;
salvaging an incomplete output of the tool generated during the running until termination of the running;
checking a validity of the incomplete output following the termination;
finalizing the incomplete output in an event the incomplete output is valid; and
recording the incomplete output having been finalized as an output file,
wherein:
the condition comprises a memory consumption condition characterized in that an amount of memory consumed by the run of the tool is close to a boundary amount of memory, which is permitted to be consumed for the run of the tool, and the tool has not begun creating an output,
the tool comprises a test generator tool that uses randomization to generate instructions, and
the output file comprises a sequence of address lines and a randomized instruction stored on each of the address lines, with a last one of the address lines having a special instruction to signal an end of the sequence which is added thereto by a checking unit configured for executing the checking of the validity.

2. The method according to claim 1, wherein the condition further comprises a timing condition characterized in that the run of the tool is incomplete as a time limit for the run of the tool approaches and historical data does not indicate that a remainder of the run can be completed within a remainder of the time limit.

3. The method according to claim 1, wherein the condition comprises plural conditions and the checking comprises checking whether one or more of the plural conditions is likely to be met during and in parallel with the running of the tool.

4. The method according to claim 1, wherein the checking comprises a heuristic analysis of historical and current data.

5. The method according to claim 1, wherein the finalizing comprises adding a special instruction or set of special instructions to the incomplete output.

6. A computer system for salvaging an output of a tool, the computer system comprising:
a processor; and
a memory, the memory having executable instructions stored thereon, which, when executed, cause the processor to execute a method comprising:
checking whether one or more conditions is likely to be met during a running of the tool;
terminating the running in an event the one or more conditions is likely to be met;
salvaging an incomplete output of the tool generated during the running until the terminating;
checking a validity of the incomplete output;
finalizing the incomplete output in an event the incomplete output is valid; and
recording the incomplete output having been finalized as an output file in an event the incomplete output is validated,
wherein the one or more conditions comprise at least one of:
a memory consumption condition characterized in that an amount of memory consumed by the run of the tool is close to a boundary amount of memory, which is permitted to be consumed for the run of the tool, and the tool has not begun creating an output, and
a timing condition characterized in that the run of the tool is incomplete as a time limit for the run of the tool approaches and historical data does not indicate that a remainder of the run can be completed within a remainder of the time limit, wherein:
the processor comprises a generation unit configured to add a control statement into logic of the tool to terminate the running of the tool, an injecting unit configured to check whether the one or more conditions are likely to be met during the running of the tool and to cause the generation unit to add the control statement to the logic of the tool, a checking unit configured to check the validity of the incomplete output of the tool and to finalize the incomplete output in an event the incomplete output is valid and a recording unit configured to record the incomplete output having been finalized as the output file,
the tool comprises a test generator tool that uses randomization to generate instructions, and
the output file comprises a sequence of address lines and a randomized instruction stored on each of the address lines, with a last one of the address lines having a special instruction added thereto by the checking unit to signal an end of the sequence.

7. The computer system according to claim 6, wherein the one or more conditions comprise the memory consumption condition and the timing condition.

8. The computer system according to claim 6, wherein the checking comprises a heuristic analysis of historical and current data.

9. The computer system according to claim 6, wherein the finalizing comprises adding a special instruction or a set of special instructions to the incomplete output.

10. A method of salvaging an output of a tool, comprising:
defining a condition for terminating a run of the tool;
running the tool;
checking whether the condition is likely to be met during the running of the tool;
injecting a control statement into logic of the tool to terminate the running in an event the condition is likely to be met;
salvaging an incomplete output of the tool generated during the running until termination of the running;
checking a validity of the incomplete output following the termination; and
finalizing the incomplete output in an event the incomplete output is valid; and
recording the incomplete output having been finalized as an output file,
wherein:
the condition comprises a timing condition characterized in that the run of the tool is incomplete as a time limit for the run of the tool approaches and historical data does not indicate that a remainder of the run can be completed within a remainder of the time limit,
the tool comprises a test generator tool that uses randomization to generate instructions, and
the output file comprises a sequence of address lines and a randomized instruction stored on each of the address lines, with a last one of the address lines having a special instruction to signal an end of the sequence which is added thereto by a checking unit configured for executing the checking of the validity.

11. The method according to claim 10, wherein the condition further comprises a memory consumption condition characterized in that an amount of memory consumed by the run of the tool is substantially close to a boundary amount of memory, which is permitted to be consumed for the run of the tool, and the tool has not begun creating an output.

12. The method according to claim 10, wherein the condition comprises plural conditions and the checking comprises checking whether one or more of the plural conditions is likely to be met during and in parallel with the running of the tool.

13. The method according to claim 10, wherein the checking comprises a heuristic analysis of historical and current data.

14. The method according to claim 10, wherein the finalizing comprises adding a special instruction or set of special instructions to the incomplete output.

* * * * *